May 17, 1932.  H. WEICHSEL  1,858,255
ALTERNATING CURRENT MOTOR
Filed Jan. 28, 1931

Inventor
Hans Weichsel
By E. E. Huffman
Att'y.

Patented May 17, 1932

1,858,255

UNITED STATES PATENT OFFICE

HANS WEICHSEL, OF ST. LOUIS, MISSOURI, ASSIGNOR TO WAGNER ELECTRIC CORPORATION, OF ST. LOUIS, MISSOURI, A CORPORATION OF DELAWARE

ALTERNATING CURRENT MOTOR

Application filed January 28, 1931. Serial No. 511,702.

My invention relates to split phase motors of the condenser type, and its object is to provide improved means for reducing the total capacity of the phase displacing circuit after the motor has attained operating speed. By my invention this capacity change is brought about without producing any destructive arcing at contacts.

Figure 1:
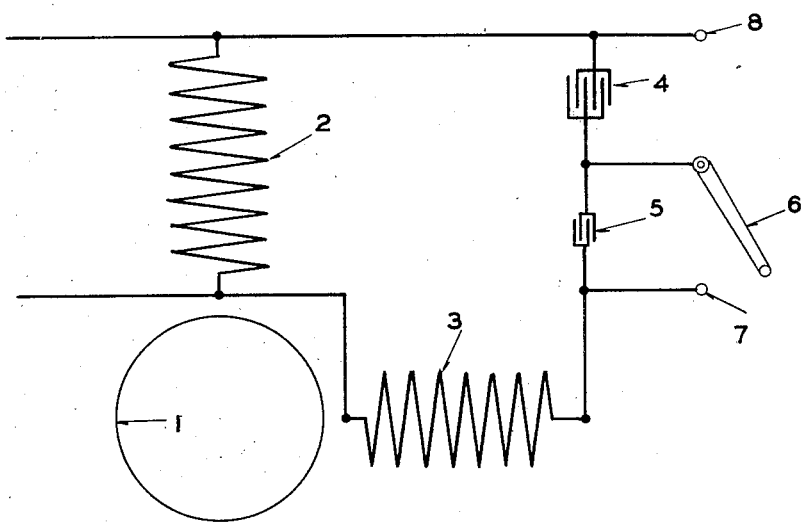
Figure 2:
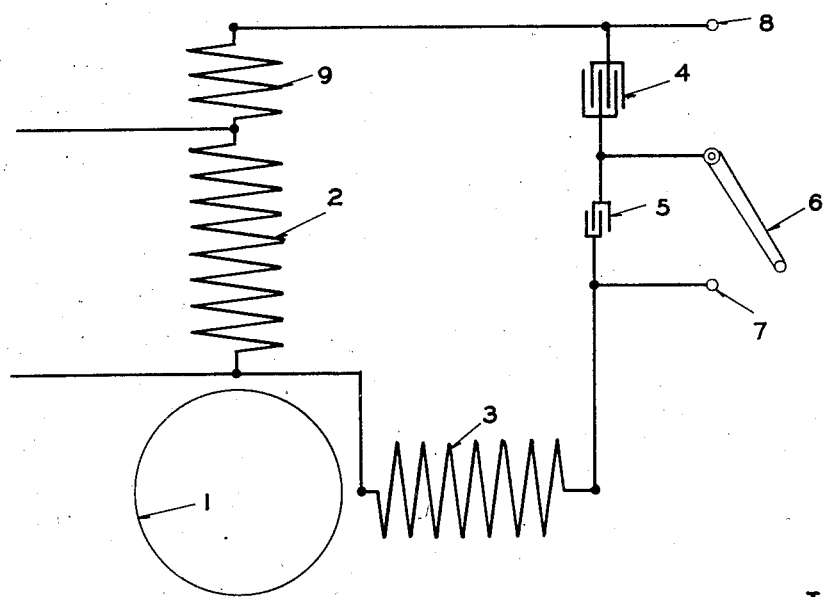

In the accompanying drawings, which illustrate an embodiment of my invention, Figure 1 shows a split phase motor in which the voltage impressed upon the phase displacing circuit of the line is the same as that impressed upon the main inducing winding, whereas Figure 2 shows a modification in which the voltage impressed upon the phase displacing circuit is greater than that impressed upon the main inducing winding.

1 diagrammatically represents a rotor having a permanently short-circuited winding which may be of the squirrel-cage or other desired type. The stator is provided with a main inducing winding 2 and with an auxiliary inducing winding 3. The auxiliary inducing winding is displaced preferably by 90 electrical degrees from the main inducing winding and is connected to the line in parallel with the latter winding by means of a phase displacing circuit which comprises condensers 4 and 5 connected in series. Condenser 5 is proportioned to have the capacity desirable for normal operation of the machine, and condenser 4 is of larger capacity than condenser 5, its capacity being that suitable for the production of the desired starting torque. Condenser 5 may be of the paper type and condenser 4 may be of the electrolytic type.

A shunt circuit around the condenser 5 is provided which comprises the switch 6. When the machine is to be started this switch is closed on contact 7 and the condenser 5 is, therefore, ineffective. When normal speed is approached the switch is opened and may be moved to contact 8, whereby a shunt circuit rendering condenser 4 ineffective, will be established. Since the capacity of condenser 4 will usually be much larger than that of condenser 5, the maintenance of condenser 4 in the circuit during normal operation will not greatly decrease the total capacity of the circuit.

It will be noted that with the arrangement described the opening of the switch 6 will not result in the production of a spark at the contacts since these are bridged by the condenser 5.

Figure 2 differs from Figure 1 only in the provision of additional winding turns 9 in the axis of the winding 2 whereby the voltage impressed on the phase displacing circuit will be greater than that impressed on the winding 2. Under this modification it will be apparent that the condensers 4 and 5 may be smaller due to the fact that a higher voltage is impressed upon the phase displacing circuit.

Having fully described my invention, what I claim as new and desire to secure by Letters Patent of the United States is:

1. In an alternating current motor, an induced member, an inducing member provided with a main inducing winding and with an auxiliary inducing winding displaced therefrom, a phase displacing circuit comprising said auxiliary inducing winding and two condensers connected in series with each other and with said auxiliary winding, and a shunt circuit for rendering one of said condensers ineffective at starting.

2. In an alternating current motor, an induced member, an inducing member provided with a main inducing winding and with an auxiliary inducing winding displaced therefrom, a phase displacing circuit comprising said auxiliary inducing winding and two condensers connected in series, means for rendering one of said condensers ineffective at starting, and means for rendering the other condenser ineffective during running.

3. In an alternating current motor, an induced member, an inducing member provided with a main inducing winding and with an auxiliary inducing winding displaced therefrom, a phase displacing circuit comprising said auxiliary inducing winding and two condensers connected in series with each other and with said auxiliary winding, one of said condensers having greater capacity than the other, and a shunt circuit for rendering the said condenser of smaller capacity ineffective at starting.

In testimony whereof, I hereunto affix my signature, this 23d day of January, 1931.

HANS WEICHSEL.